July 15, 1947.  O. CHATELAIN  2,424,020

SINGLE-PHASE SYNCHRONOUS MOTOR OF SMALL SIZE

Filed Sept. 5, 1944  2 Sheets-Sheet 1

Inventor
O. Chatelain

Inventor
O. Chatelain

Patented July 15, 1947

2,424,020

UNITED STATES PATENT OFFICE 2,424,020

SINGLE-PHASE SYNCHRONOUS MOTOR OF SMALL SIZE

Oscar Chatelain, Le Locle, Switzerland

Application September 5, 1944, Serial No. 552,767
In Switzerland July 31, 1943

7 Claims. (Cl. 172—278)

This invention relates to single-phase synchronous motors of small size such as used in different apparatus of small machines where they work under quite particular conditions. These motors must start automatically and always in the same direction. They must not become hot, not even after several hours of service, because the heat developed does not only injure the lubrication of these motors but even that of the mechanism coupled with them. Besides this, the space required for a given power should be as small as possible.

It is very difficult to unite all these qualities in the same motor, because the conditions for obtaining the one exclude the other. There are, above all, the power of the motor and the cooling conditions which act against a reduction of the space required.

Object of the invention is a synchronous motor of small dimensions and automatic start in which electric conditions are fulfilled, allowing three and four times the power of known motors of the same space required to be obtained. This is possible owing to the fact that, according to the invention, the motor has a single magnetic circuit formed at each end of a field coil by a toothed disk fixed to the shaft of the motor, one at least of these disks being magnetised.

The motor can, by preference, comprise a hollow cylindrical case containing the coil and a hollow core around which this coil is arranged. These two parts of the magnetic circuit are magnetically connected at their ends by the toothed disks fixed to the shaft of the motor. Other features augmenting the efficiency at a given encumbrance will be apparent as the following description proceeds, reference being had to the accompanying drawings which, by way of examples, illustrate different embodiments of the synchronous motor according to the invention.

Figure 1:
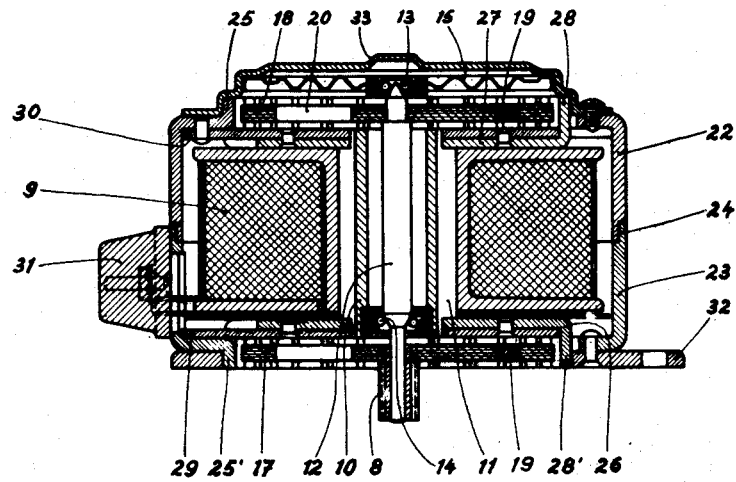
Fig. 1 is a vertical section along line I—I of Fig. 2 of a first embodiment.
Figure 2:
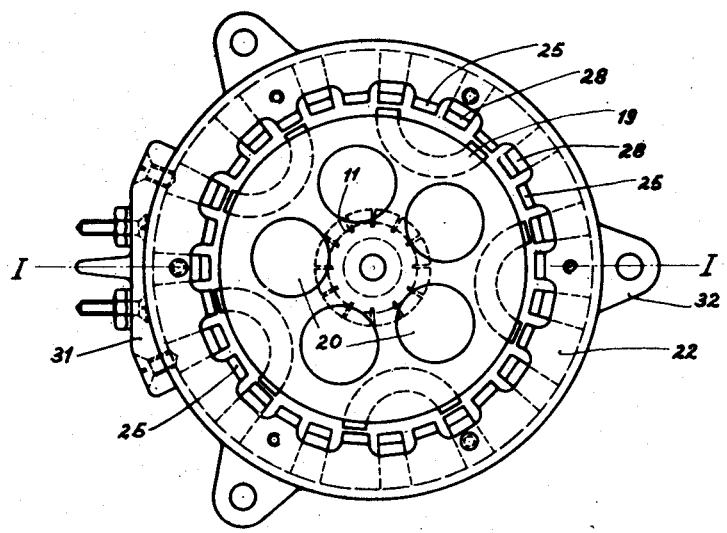
Fig. 2 is a plan view with the cover removed.

The motor shown in Figs. 1 and 2 has a field coil 9, the central core 10 of which is hollow and has longitudinal ventilation channels 11. A shaft 12 goes through the core 10 and is mounted on ball bearings 13 and 14. Bearing 13 is held by an elastic diaphragm 15 pressing the balls against the end of the shaft to which a drive pinion 8 is fixed.

The central core 10 carries two plates 26 and 27, the flanged rims of which have teeth 28 and 28' and form part of the inductors of the stator. This latter carries two case-parts 22 and 23 fitted into each other at 24, the free ends of which are likewise flanged and provided with teeth 25 and 25'.

In the space limited by the teeth 25 and 28 two rotatable disks 17 and 18 made of Bakelite are arranged, which are fixed to the ends of the shaft 12. Into each of these disks five bipolar magnets 19 are embedded which all have the same magnetic characteristics. The whole, formed of these disks and of these magnets, constitutes the rotor. The magnets of the disk 17 are angularly displaced with regard to disk 18. The circular cut-outs 20 diminish the weight of the disks 17 and 18.

Two plates 29 and 30 of non-magnetic material are riveted to the plates 26 and 27 and serve to assemble the coil and the case formed by the parts 22 and 23.

The terminals of the motor are designated by 31. The whole is mounted on a plate 32, on the opposite side a cover 38 is provided.

Figure 3:
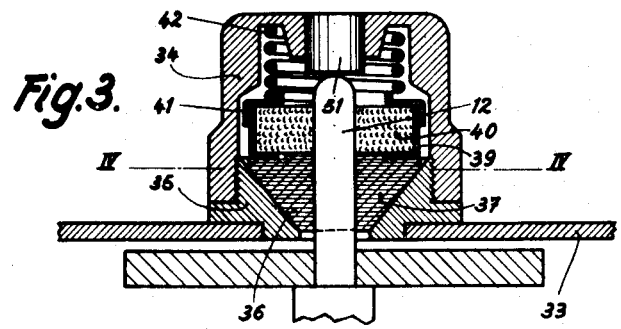
Fig. 3 is a section through a bearing, on a greater scale than the preceding figures.
Figure 4:
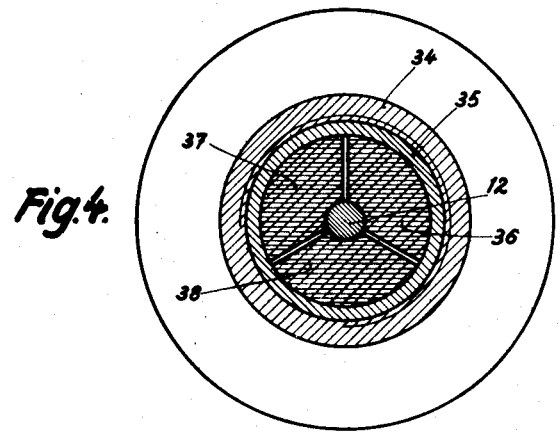
Fig. 4 is a section along line IV—IV of Fig. 3.

Figs. 3 and 4 illustrate a bearing with a movable bush guaranteeing a perfectly silent operation of the motor while lubricating the same. This bearing comprises a base 35 to which a cap 34 is screwed and into which bush-parts 36, 37, 38 of coloron are inserted, the shaft 12 supported on the end bearing 15 is rotatably mounted on these bush-parts.

A spring 42 bears on the bush-parts 36, 37, 38 by means of a cover 41 of a case 39 containing a sheet of felt impregnated with oil. This arrangement guarantees a silent operation of the apparatus in spite of the wearing of the bush-parts, which would otherwise result in continuous vibrations if it were not compensated by the spring 42. The oil contained in the felt sheet 40 oozes along the central shaft 12 and lubricates the motor regularly and constantly.

Figure 5:
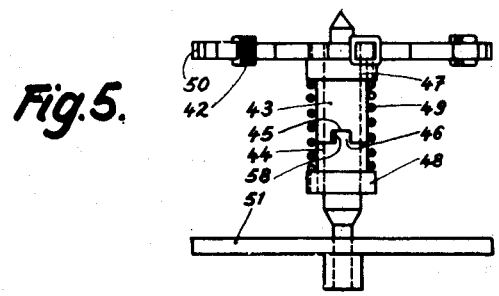
Fig. 5 is a view of a device guaranteeing a start always in the same direction.
Figure 6:
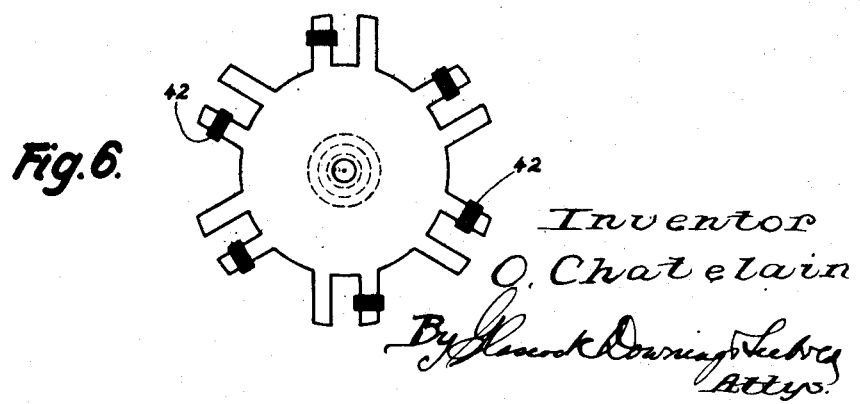
Fig. 6 is a plan view of Fig. 5.

Figs. 5 and 6 show the rotor of a motor which always starts in the same direction. It is characterised in that one of the disks, 50, of the rotor is made of soft non-magnetic steel. It is toothed and carries rings 42 the number of which depends on the value of the moment of inertia to be given. The disks 50 and 51 of the rotor are fixed to a shaft made in two pieces 43 and 44, coupled with each other by a notch 45 and a nose 46 entering said notch 45 with a certain play 58. The parts 43 and 44 have shoulders 47 and 48 to which the ends of a spring 49 are fixed.

When an exciting current is given to the field coil 9, the alternating field induced in the stator causes the magnets embedded in the disks of Bakelite 17 and 18 of the rotor to vibrate.

When the vibrations of the rotor, considerably amplified by the displacement of the permanent magnets of one disk with regard to those of the other disk, approach a pole of a magnet to the inductor tooth lying in front of said pole, the impulse given to the mass of the rotor and the change in the polarisation of the adjacent tooth tend to accentuate the rotating movement of the rotor in one or the other direction as is the case in single-phase synchronous motors with magnetised rotor.

In order to guarantee the starting always in the same direction either a clickwork of known type may be used or one of the disks of the rotor carrying the magnets may be replaced by a disk of non-magnetic steel as described with regard to Figs. 5 and 6. When the disk 51 carrying the magnets starts in the direction desired, it takes along the disk 50 with a slight delay owing to the fact that it must first run through the play 58. During this time the spring 49 is loaded, then, on releasing, it moves the piece 44 and, in consequence, the disk 50. At this moment the attraction of the magnets of the disk 51 is great enough to continue the movement in the same direction.

When the disk 51 of the rotor starts in the opposite direction, it tends to take along directly the disk 50 by means of the notch 45. The inertia of this disk is great enough with regard to the turning moment of the motor that the motor is forced to change the direction of rotation.

In both embodiments the motor has a single magnetic circuit composed of the core, the case formed by the parts 22, 23, and of the toothed parts of the rotor which are arranged between these two flux conductors. In this way it is possible to obtain, with the same dimensions, a turning moment of the motor which both at the start and during working, is two to four times the moment of the known synchronous motors of this type. In the example shown in Figs. 1 and 2 the multipolar magnets of the rotor are each formed by a disk of synthetic resin in which small bipolar magnets are enveloped. However, it is also possible, in place of these disks to use multipolar-magnets made in one piece, for instance, of cobalt steel.

What I claim is:

1. In a small single-phase self-starting synchronous motor, a single field coil having a core, a shaft, frame members surrounding said field coil on all sides and having toothed parts lateral to said field coil, adjacent teeth of said parts being of different polarity, and two rotary discs limiting a space in which said field coil lies, one of these rotary discs at least comprising permanent magnets lying side by side with adjacent poles of different magnetic polarity, mounted on said shaft in the space surrounded by said teeth, said core, said frame members and said rotary discs forming together the single existing magnetic circuit so that said core is traversed over its whole length by the total magnetic flux.

2. In a small single-phase self-starting synchronous motor, a single field coil having a core, a shaft, frame members surrounding said field coil on all sides, one of said members being formed as a case part with a toothed end, another of said members forming a disc with a toothed rim lateral to said field coil, the teeth of said disc lying between the teeth of said toothed end, adjacent teeth of said case part and of said disc being of different polarity, and two rotary discs limiting a space in which said field coil lies, one of those rotary discs at least comprising permanent magnets lying side by side with adjacent poles of different magnetic polarity, mounted on said shaft in the space surrounded by said toothed end and said toothed rim, said core, said frame members and said rotary disc forming together the single existing magnetic circuit, so that said core is traversed over its whole length by the total magnetic flux.

3. In a small single-phase self-starting synchronous motor, a single field coil having a core, a shaft, frame members surrounding said field coil on all sides, one of said members being formed as a case part with toothed ends, the others of said members forming two discs lateral to each end of said field coil, said discs having a toothed rim the teeth of which lie between the teeth of said toothed ends, adjacent teeth of said toothed ends and of said toothed rim being of different polarity, and two rotary discs comprising permanent magnets lying side by side with adjacent poles of different magnetic polarity, mounted on said shaft lateral to each end of said field coil in the spaces surrounded by said toothed ends and said toothed rims, said core, said frame members and said rotary discs forming together the single existing magnetic circuit so that said core is traversed over its whole length by the total magnetic flux.

4. In a small single-phase self-starting synchronous motor, a single field coil having a core, a shaft, frame members surrounding said field coil on all sides, one of said members being formed as a case part with toothed ends, the others of said members forming two discs lateral to each end of said field coil, said discs having a toothed rim the teeth of which lie between the teeth of said toothed ends, adjacent teeth of said toothed ends and of said toothed rims being of different polarity, and two rotary discs mounted on said shaft lateral to each end of said field coil in the space surrounded by said toothed ends and said toothed rims, one of said rotary discs comprising permanent magnets lying side by side with adjacent poles of different polarity, the other being of non-magnetic steel, said core, said frame members and said rotary discs forming together the single existing magnetic circuit so that said core is traversed over its whole length by the total magnetic flux.

5. In a small single-phase self-starting synchronous motor, a single field coil having a core, a shaft, frame members surrounding said field coil on all sides, one of said members being formed as a case part with toothed ends, the others of said members forming two discs lateral to each end of said field coil, said discs having a toothed rim the teeth of which lie between the teeth of said toothed ends, adjacent teeth of said toothed ends and of said toothed rims being of different polarity, two rotary discs of insulated material mounted on said shaft lateral to each end of said field coil in the space surrounded by said toothed ends and said toothed rims, and permanent magnets embedded in said rotary discs and lying side by side with adjacent poles of different polarity, said core, said frame members, and said rotary discs forming together the single existing magnetic circuit so that said core is traversed over its whole length by the total magnetic flux.

6. In a small single-phase self-starting synchronous motor, a single field coil having a core, a shaft, frame members surrounding said field coil on all sides, one of said members being formed as a cylinder with toothed ends, the others of said members forming two discs lateral to each end of said field coil, said discs having a toothed rim the teeth of which lie between the teeth of said toothed ends, adjacent teeth of said toothed ends and of said toothed rims being of different polarity, and two rotary toothed discs, one of these discs being non-magnetised and the other comprising permanent magnets lying side by side with adjacent poles of different polarity, said discs being mounted with mutual angular displacement on said shaft lateral to each end of said field coil in the space surrounded by said toothed ends and said toothed rims, said core, said frame members and said rotary discs forming together the single existing magnetic circuit so that said core is traversed over its whole length by the total magnetic flux.

7. In a small single-phase self-starting synchronous motor according to claim 6, said shaft made in two pieces fitting into each other with radial play, and a helical spring coupling said pieces with each other, said rotary toothed discs being carried by said pieces.

OSCAR CHATELAIN.

REFERENCES CITED

The following references are of record in the file of this patent:

UNITED STATES PATENTS

| Number | Name | Date |
| --- | --- | --- |
| 1,962,770 | Holtz | June 12, 1934 |
| 1,966,897 | Lofgren | July 17, 1934 |
| 2,383,828 | Swift | Aug. 28, 1945 |
| Re. 19,481 | Toewe | Feb. 26, 1935 |
| 2,012,207 | Walton | Aug. 20, 1935 |
| 2,081,993 | Gebhardt | June 1, 1937 |
| 2,122,307 | Welch | June 28, 1938 |

FOREIGN PATENTS

| Number | Country | Date |
| --- | --- | --- |
| 366,566 | Great Britain | Feb. 4, 1932 |